(12) United States Patent
Jokiel et al.

(10) Patent No.: US 9,085,249 B2
(45) Date of Patent: Jul. 21, 2015

(54) METHOD FOR PRODUCING A VEHICLE SEAT FITTING

(75) Inventors: Christian Jokiel, Heiligenshaus (DE); Ulrich Lehmann, Alfter (DE)

(73) Assignee: Keiper GMBH & Co. KG, Kaiserslautern (DE)

( * ) Notice: Subject to any disclaimer, the term of this patent is extended or adjusted under 35 U.S.C. 154(b) by 333 days.

(21) Appl. No.: 13/636,525

(22) PCT Filed: Dec. 4, 2010

(86) PCT No.: PCT/EP2010/007375
§ 371 (c)(1),
(2), (4) Date: Sep. 21, 2012

(87) PCT Pub. No.: WO2011/116799
PCT Pub. Date: Sep. 29, 2011

(65) Prior Publication Data
US 2013/0009439 A1    Jan. 10, 2013

(30) Foreign Application Priority Data
Mar. 22, 2010   (DE) .......................... 10 2010 013 091

(51) Int. Cl.
*B60N 2/02*       (2006.01)
*B60N 2/225*      (2006.01)

(52) U.S. Cl.
CPC ............ *B60N 2/2252* (2013.01); *B60N 2/2254* (2013.01); *Y10T 29/4987* (2015.01)

(58) Field of Classification Search
CPC ............................ B60N 2/2252; B60N 2/2254
USPC ................................ 297/362, 362.12, 367 R
See application file for complete search history.

(56) References Cited

U.S. PATENT DOCUMENTS

| 4,134,175 | A  | * | 1/1979  | Contoyanis ...................... 16/2.1 |
| 5,871,414 | A  | * | 2/1999  | Voss et al. ...................... 475/175 |
| 6,543,851 | B2 | * | 4/2003  | Schillak ........................ 297/362 |
| 6,715,832 | B2 | * | 4/2004  | Dill .............................. 297/313 |
| 6,799,806 | B2 |   | 10/2004 | Eppert et al. |
| 7,571,962 | B2 | * | 8/2009  | Thiel et al. ................ 297/367 R |
| 2005/0091829 | A1 |  | 5/2005  | Yoon et al. |

FOREIGN PATENT DOCUMENTS

| CN | 1135953   A  | 11/1996 |
| CN | 1157754   A  | 8/1997  |
| DE | 27 24 047 A1 | 12/1978 |
| DE | 31 13 447 A1 | 10/1982 |
| DE | 44 36 101 A1 | 6/1995  |

(Continued)

OTHER PUBLICATIONS

Chinese Office Action date May 6, 2014 for Chinese application No. 201080065660.8.

(Continued)

*Primary Examiner* — Laurie Cranmer
(74) *Attorney, Agent, or Firm* — The Dobrusin Law Firm, P.C.

(57) ABSTRACT

A method for producing a vehicle seat fitting involves a sliding bearing bushing (28) being pressed in the axial direction into a receptacle in a first fitting part (11). The pressed-in sliding bearing bushing (28) has a radially protruding securing region (28*b*). The securing region (28*b*) is formed before or after the pressing-in operation.

5 Claims, 7 Drawing Sheets

(56) References Cited

FOREIGN PATENT DOCUMENTS

| | | |
|---|---|---|
| DE | 44 11 214 A1 | 10/1995 |
| DE | 195 48 809 C1 | 5/1997 |
| DE | 44 11 214 C2 | 10/1997 |
| DE | 10 2007 010 078 B4 | 11/2008 |
| DE | 20 2009 007 520 U1 | 8/2009 |
| DE | 10 2009 022 767 B3 | 5/2010 |
| EP | 0 098 400 A2 | 1/1984 |
| JP | 07-012136 | 1/1995 |
| JP | 7-12136 A | 1/1995 |
| JP | 07-279947 | 10/1995 |
| JP | 7-279947 A | 10/1995 |
| JP | 09-264305 | 10/1997 |
| JP | 2005-21486 A | 1/2005 |
| JP | 2008/175384 A | 7/2008 |
| JP | 2009/85232 A | 4/2009 |

OTHER PUBLICATIONS

Japanese Office Action dated Nov. 19, 2013; Appln. No. JP2012-556386.

Japanese Office Action for Application No. JP2012-556386 dated May 7, 2014.

Korean Office Action dated Feb. 28, 2014, Korean Application No. 10-2012-7024632.

* cited by examiner

METHOD FOR PRODUCING A VEHICLE SEAT FITTING

CROSS REFERENCE TO RELATED APPLICATION

This application is a United States National Phase application of International Application International Application PCT/EP2010/007375 of Dec. 4, 2010 which designated inter alia the United States and which claims the priority of German Application DE 10 2010 013 091.5 of Mar. 22, 2010. The entire contents of each application is hereby incorporated by reference in its entirety.

FIELD OF THE INVENTION

The invention relates to a method for producing a vehicle seat fitting in which a sliding bearing bushing is pressed in the axial direction into a receptacle of a first fitting part.

BACKGROUND OF THE INVENTION

In DE 44 11 214 C2 it is disclosed how the sliding bearing bushing is inserted into the receptacle of the first fitting part. To this end, in a first step the first fitting part is fastened in a holder of a tool and the sliding bearing bushing is positioned on a mandrel of the tool. In a second step, the sliding bearing bushing is pressed into the receptacle of the first fitting part by a relative movement of the mandrel and the holder. The external dimension of the sliding bearing bushing is selected in the context of an interference fit to be slightly larger than the internal dimension of the receptacle of the first fitting part, so that material which collects on the trailing end of the sliding bearing bushing—relative to the movement of the mandrel—is displaced and serves as axial securing.

SUMMARY OF THE INVENTION

An object of the invention is to improve a method of the type mentioned in the introduction.

According to the invention, a method is provided for producing a vehicle seat fitting. The method comprises the steps of pressing a sliding bearing bushing in an axial direction into a receptacle of a first fitting part, wherein the pressed-in sliding bearing bushing comprises a radially protruding securing region. The securing region is formed before or after the pressing-in step.

According to another aspect of the invention, a fitting is provided comprising a first fitting part and a second fitting part, the fitting being connected to a seat part of a vehicle seat by one of the first fitting part and the second fitting part and being connected to a backrest of the vehicle seat by the other of the one of the first fitting part and the second fitting part. A sliding bearing bushing is pressed in an axial direction into a receptacle of the first fitting part to provide a pressed-in sliding bearing bushing. The pressed-in sliding bearing bushing comprises a radially protruding securing region the securing region is formed before or after the pressing-in to provide the pressed-in sliding bearing bushing.

The formation of a securing region of the sliding bearing bushing, which acts as axial securing against displacement of the sliding bearing bushing in the axial direction (away from the second fitting part), wherein the securing region is formed before or after the pressing-in operation, has the advantage that such an axial securing does not have to be achieved by the pressing-in operation, i.e. it becomes more independent of tolerances. The radial overlap of the slightly larger sliding bearing bushing and the slightly smaller receptacle of the first fitting part is able to be kept small. This reduces the expenditure of force during the pressing-in operation.

The formation of the gear ring on the first fitting part receiving the eccentric and the formation of the gearwheel on the second fitting part supporting the eccentric saves on material and constructional space, by the gearwheel being able to be configured on the radial external edge of the second fitting part (which then preferably encompasses a clamping ring fastened to the first fitting part) whilst sufficiently large connecting regions are available on the second fitting part for mounting the fitting. The gearwheel on the radial external edge of the second fitting part is then preferably encompassed by a clamping ring fastened to the first fitting part. The substantially planar form of the clamping ring requires less material relative to the known configuration which is profiled in an L-shaped manner, which leads to a saving of weight and costs.

The design of the toothed portion—separately relative to the gear ring—on the first fitting part receiving the eccentric, allows the concept to be adopted of locking the eccentric in the non-driven state of the fitting, as is disclosed in DE 195 48 809 C1. Without the locking element disclosed therein, it could lead to movements of the wedge segments by rattling and knocking under dynamic operating conditions, i.e. during travel, which in turn could lead to a relative movement of the fitting parts, so-called "spooling". The locking element prevents spooling, on the one hand, by securing the wedge segments by means of the edges of openings formed thereon and by means of end fingers of a spring acting on the wedge segments and, on the other hand, by cooperating with one of the fitting parts by means of latching lugs configured thereon.

When stamping the gear ring, an outwardly facing counter toothed portion is produced on the reverse side thereof. The separate configuration of the toothed portion from the gear ring permits an adaptation of the geometries of the locking element and toothed portion which saves on constructional space.

The locking element preferably has an annular shape, for example consisting of two curves, and is preferably located on an overlap of a sliding bearing bushing, by means of which the first fitting part receives the eccentric. Corresponding spring arms ensure a non-positive connection. Optionally, guide portions may be provided which improve the mounting on the overlap. A one-piece configuration made of spring steel permits a simple integration of the features of the locking element. For the cooperation with the toothed portion of the first fitting part, which is preferably configured as a gear ring with radially inwardly facing teeth, locking lugs are preferably provided, these locking lugs facing radially outwards. For cooperation with the eccentric, openings are preferably provided, these openings penetrating the spring of the eccentric which preferably consists of two wedge segments. For cooperation with the drive element, support fingers are preferably provided which the drive element is able to act upon by means of striking.

Relative to solutions in which the locking element cooperates with toothed portions on the sliding bearing bushing (DE 10 2007 010 078 B4) or on a collar of the receptacle lined by the sliding bearing bushing, in the present case there is the advantage that a larger radius of the toothed portion defines a larger lever arm for the locking torque.

The locking element primarily serves for locking the fitting under dynamic loads. The main component when locking is applied by friction between the eccentric and one of the two fitting parts, preferably the second fitting part, which preferably comprises a collar for supporting the eccentric. The wedge segments which are preferably provided and which define the eccentric, serve both for locking and for producing the rolling motion of the gearwheel and gear ring.

The use of the eccentric epicylcic gearing permits a stepless adjustment of the inclination of the backrest. The omission of a central pinion relative to a planetary gear system leads to the production of a wobble motion which is superimposed by the relative rotation of the fitting parts. The eccentric epicyclic gearing may be driven manually or by motor.

The invention is described in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 6:
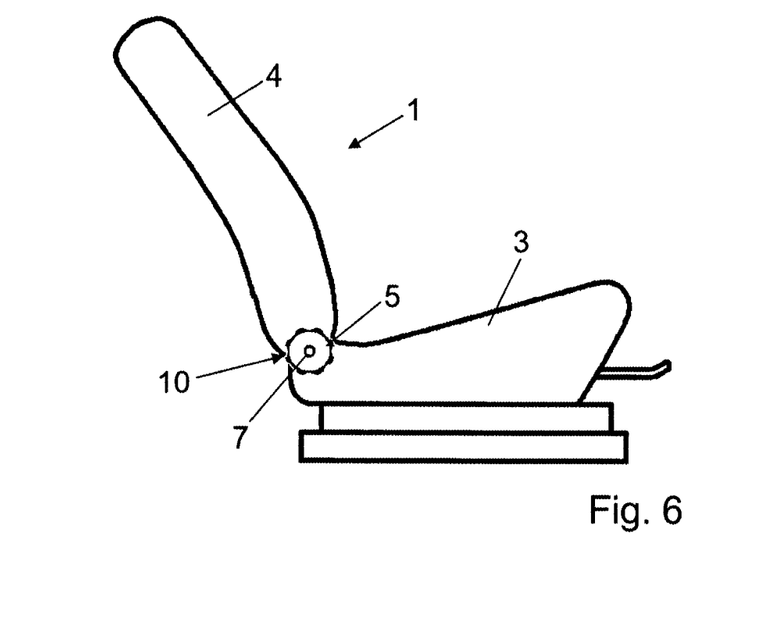
FIG. 6 is a schematic view of a vehicle seat.

A vehicle seat 1 for a motor vehicle comprises a seat part 3 and a backrest 4 which may be adjusted in its inclination relative to the seat part 3. A drive shaft 7 is rotated for manually adjusting the inclination of the backrest 4, for example by means of a handwheel 5, or by motor, for example by means of an electric motor, this drive shaft being arranged horizontally in the transition region between the seat part 3 and backrest 4. On both sides of the vehicle seat 1 the drive shaft 7 engages fixedly in terms of rotation in one respective fitting 10. The drive shaft 7 defines the directional information used of a cylinder coordinate system.

Figure 1:
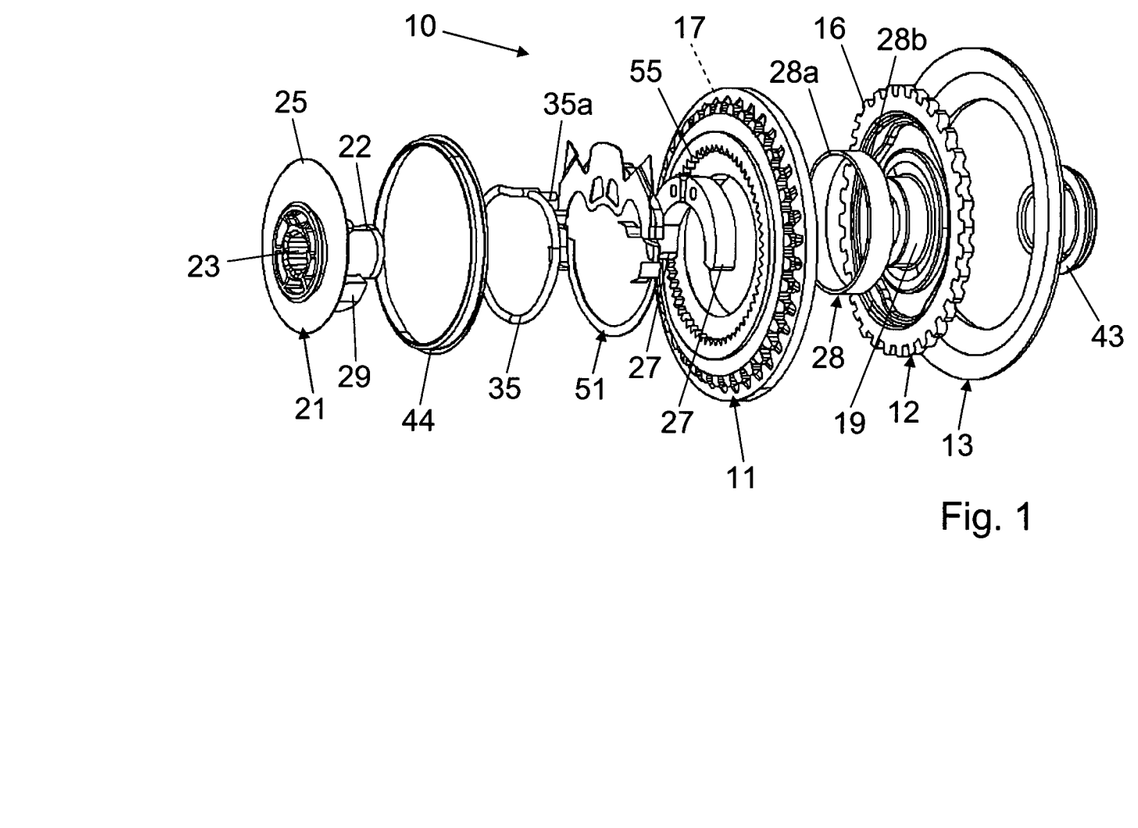
FIG. 1 is an exploded view of the fitting.
Figure 4:
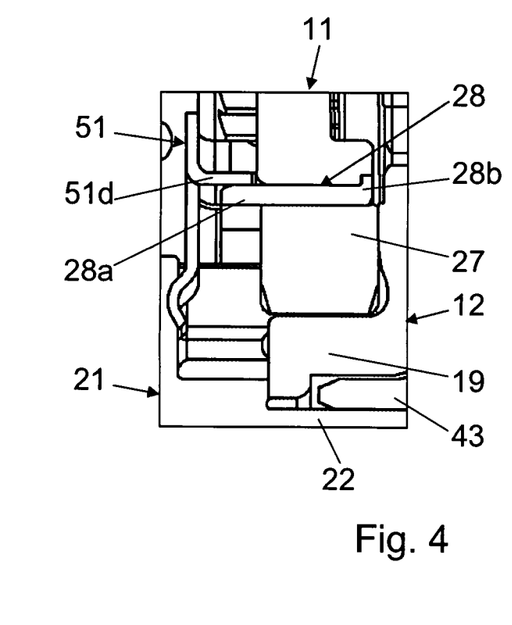
FIG. 4 is a partial sectional view through the fitting.

The fitting 10 comprises a first fitting part 11 and a second fitting part 12 which may be rotated relative to one another. The two fitting parts 11 and 12 in each case may approximately describe a circular disk shape. A clamping ring 13 is provided for receiving axially acting forces, i.e. for holding together the fitting parts 11 and 12. Such an attachment by means of a clamping ring is, for example, disclosed in U.S. Pat. No. 6,799,806 A. The preferably metal clamping ring 13 is fixedly connected to one of the two fitting parts 11 and 12, in the present case the first fitting part 11 in an external edge portion, for example welded or crimped. Optionally by the interposition of a separate sliding ring, by means of a radially inwardly facing edge, the clamping ring 13 radially outwardly encompasses the other of the two fitting parts 11 and 12 which is movable relative thereto, without preventing the relative rotation of the two fitting parts 11 and 12. In terms of construction, the two fitting parts 11 and 12, therefore, together form a disk-shaped unit (with the clamping ring 13).

When mounting the fitting 10, the first fitting part 11, for example, is fixedly connected to the structure of the backrest 4, i.e. fixed to the backrest part. The second fitting part 12 is then fixedly connected to the structure of the seat part 3, i.e. fixed to the seat part. The associations of the fitting parts 11 and 12, however, may also be interchanged, i.e. the first fitting part 11 could be fixed to the seat part and the second fitting part 12 fixed to the backrest. The fitting 10 is thus located in the flux of force between the backrest 4 and seat part 3 which is why the two fitting parts 11 and 12 consist of metal, preferably of steel.

The fitting 10 is configured as a geared fitting in which the first fitting part 11 and the second fitting part 12 are connected together by means of a gear unit for adjusting and securing, more specifically by means of an eccentric epicyclic gearing—which in the present case is self-locking—as for example disclosed in DE 44 36 101 A1.

For forming the gear unit, an externally toothed gearwheel 16 is formed on the second fitting part 12 and an internally toothed gear ring 17 is formed on the first fitting part 11, these elements meshing together. The diameter of the tip circle of the external toothed portion of the gearwheel 16 is smaller by at least one tooth height than the diameter of the root circle of the internal toothed portion of the gear ring 17. A corresponding difference in the number of teeth of the gearwheel 16 and the gear ring 17 by at least one tooth permits a rolling movement of the gear ring 17 on the gearwheel 16. The formation of the gearwheel 16 and gear ring 17 preferably takes place by means of a single stamping-punching process which at the same time punches out the fitting parts 11 and 12 from their original material. In the present case, the gearwheel 16 forms the radial external edge of the second fitting part 12, i.e. the second fitting part 12 terminates radially externally with the gearwheel 16.

One of the two fitting parts 11 and 12 comprises a collar 19, in the present case the second fitting part 12 concentrically to the gearwheel 16. The collar 19 may be integrally formed as a collar extension on this fitting part (i.e. configured in one piece) or fastened thereon as a separate sleeve. A drive element 21 is rotatably mounted in the collar 19 by means of a hub 22. The drive element 21 preferably consists of plastics material. The hub 22 of the drive element 21 is provided centrally with a bore 23 for receiving the drive shaft 7. The profile of the bore 23 is configured to match the profile of the drive shaft 7, in the present case a splined shaft profile. Adjacent to its hub 22, the drive element 21 comprises a cover disk 25 with a greater diameter than the hub 22, formed integrally with the hub 22.

Two wedge segments 27—with their curved internal surfaces—are supported on the collar 19, these wedge segments—with their curved external surfaces—bearing the other of the two fitting parts 11 and 12, in the present case the first fitting part 11. To this end, a receptacle of the last mentioned fitting part is lined with a sliding bearing bushing 28, preferably pressed-in fixedly in terms of rotation, against which the external surfaces of the wedge segments 27 bear. The terms "support" and "bear" are not intended to be limited to a specific direction of the flux of force through the fitting 10, as this direction depends on the mounting of the fitting 10.

The drive element 21 comprises—radially spaced apart from the hub 22—a drive element segment 29 gripping with clearance between the narrow faces of the wedge segments 27, this drive element segment being configured integrally with the cover disk 25 and the hub 22. The wedge segments 27, of which the broad sides face one another, receive in each case an angled end finger 35a of an omega-shaped spring 35, for example with one respective recess defined by protruding material parts. The spring 35 acts on the wedge segments 27 in the peripheral direction, in particular in order to force them apart, wherein the broad sides of the wedge segments 27 are in contact with one another during operation and may act on one another.

The drive element 21 is axially secured on the external face of the fitting part comprising the collar 19 by a securing ring 43, which is preferably clipped-on. On the external face of the fitting part comprising the sliding bearing bushing 28, (in the present case the first fitting part 11) a sealing ring 44 is provided between the radial external edge thereof and the cover disk 25, this sealing ring being made, for example, of rubber or soft plastics, and being connected to the cover disk 25, in particular clipped-on.

An eccentric is defined By the wedge segments 27 (and the spring 35), the eccentric pressing the gearwheel 16 into the gear ring 17 at an engagement point in the extension of the direction of the eccentricity. When driven by the (repeatedly) rotating drive shaft 7, a torque is initially transmitted to the drive element 21 and by means of the drive element segment 29 then transmitted to the eccentric thus defined, which slides along the sliding bearing bushing 28 by the displacement of the direction of the eccentricity and thus by displacement of the point of engagement of the gearwheel 16 in the gear ring 17, which constitutes a wobble rolling motion, i.e. as a relative rotation with superimposed wobble motion. The inclination of the backrest 4 is, as a result, able to be adjusted steplessly between several positions of use.

For improving the dynamic operating behavior a locking spring 51 is provided as a further locking element, as is disclosed for example in DE 195 48 809 C1. The locking spring 51 in the present case is configured in one piece from spring steel.

Figure 5:
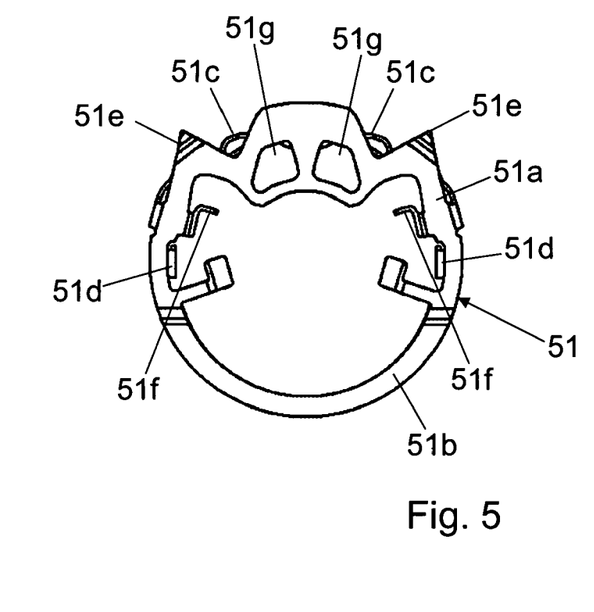
FIG. 5 is a view of the locking element.

The substantially annular locking spring 51 comprises a basic curve 51a which is arranged in a plane parallel to the first fitting part 11 and a bearing curve 51b which is arranged in a plane offset to the basic curve 51a and is adjacent to the basic curve 51a on both sides by means of one respective angled portion, forming the annular shape. Two spring arms 51c face one another with their free ends and are integrally formed on the basic curve 51a with the ends remote from one another. Whilst the basic curve 51a and the bearing curve 51b are largely located inside these two planes in the peripheral and radial direction, the two spring arms 51c extend in the axial direction between these two planes. Optionally two bent-back, cylindrically curved guide portions 51d protrude from the basic curve 51a, these guide portions also extending in the axial direction between these two planes. Finally, the locking spring 51 also comprises further locking lugs 51e which protrude radially (outward) from the basic curve 51a, two support fingers 51f which axially protrude from the basic curve 51a (or alternatively from the bearing curve 51b) and two openings 51g which are formed in the basic curve 51a.

The sliding bearing bushing 28 in the present case has a greater axial dimension than the receptacle lined thereby, so that in the axial direction it protrudes over the fitting part associated therewith, i.e. in the present case the first fitting part 11, which defines an overlap 28a. The locking spring 51 is supported on the overlap 28a of the sliding bearing bushing 28 by, on the one hand, the bearing curve 51b and, if present, the guide portions 51d bearing against the overlap 28a of the sliding bearing bushing 28, and, on the other hand, on the side radially opposing the bearing curve 51b, the spring arms 51c being tensioned against the overlap 28a of the sliding bearing bushing 28. The end fingers 35a of the spring 35 penetrate the openings 51g.

Figure 2:
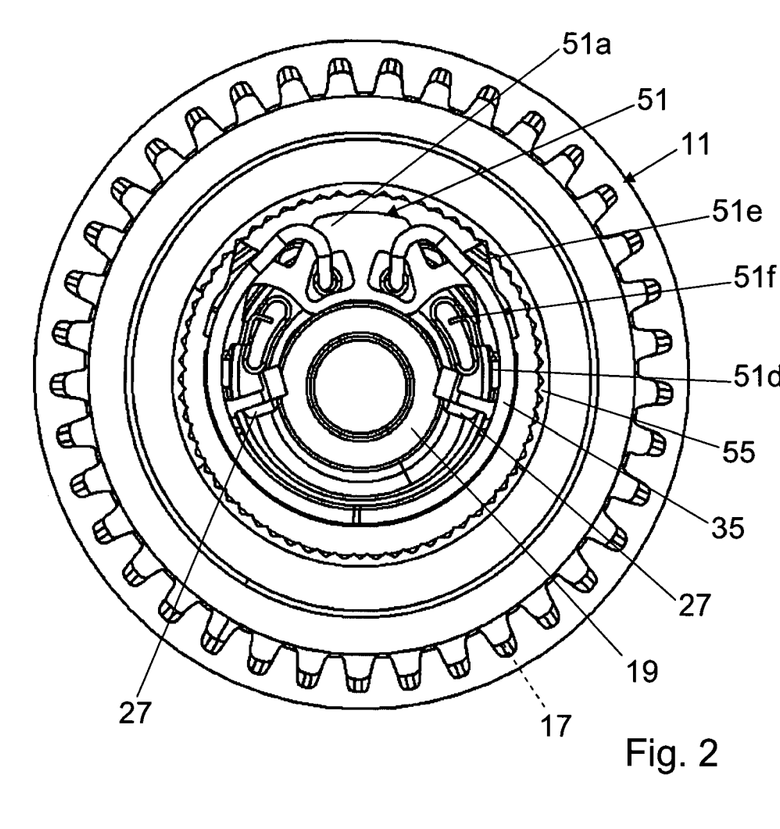
FIG. 2 is a partial view of the fitting without the drive element.

The locking spring 51 cooperates with a toothed portion 55 concentric to the sliding bearing bushing 28 and arranged radially outside the sliding bearing bushing, on the first fitting part 11, the teeth thereof facing radially inward, i.e. this toothed portion being configured as a further gear ring, in the present case on the reverse face of the gear ring 17 and concentrically thereto. The locking spring 51 locks the wedge segments 27 in the non-driven state of the fitting 10, by the locking lugs being in engagement with the toothed portion 55. A movement of the wedge segments 27 is prevented by the bearing of the end fingers 35a of the spring 35 against the edges of the respective openings 51g. As the openings 51g are larger than the cross section of the end fingers 35a, the bearing only takes place after a slight movement of at least one of the wedge segments 27—dependent on the tolerances—i.e. after a slight rotation of the eccentric.

Figure 3:
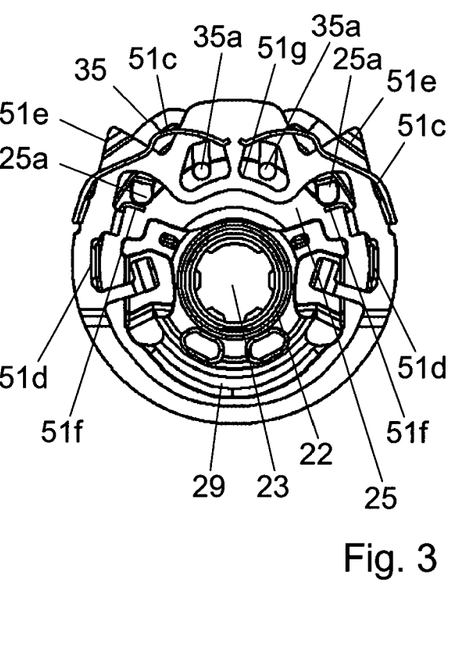
FIG. 3 is a view of the drive element, spring and locking element from the opposing direction to FIG. 2.

The locking spring 51 is released by the drive element 21 being driven, by the drive element coming to bear against one of the support fingers 51f, by means of a control cam 25a, which is preferably configured on the cover disk 25, wherein one respective control cam 25a and support finger 51f are provided for each rotational direction. When the drive element 21 acts on the support finger 51f, it starts to pull the locking lugs 51e out of the toothed portion 55, and namely radially inward. The locking spring 51, rotatably mounted on the sliding bearing bushing 28, then rotates with the drive element 21. The edges of the openings 51g remote from one another extend obliquely to the radial direction. As soon as the trailing end finger 35a comes to bear against the trailing oblique edge of the associated opening 51g, the region of the locking spring 51 moves with the locking lugs 51e, i.e. the basic curve 51a moves further radially inward. The locking lugs 51e and the toothed portion 55 then completely come out of engagement. At the same time, or subsequently, the drive element segment 29 comes to bear against the trailing wedge segment of the two wedge segments 27, whereupon the eccentric starts to rotate (revolve). If the drive element 21 is stopped, the spring arms 51c again bring the locking lugs 51e into engagement with the toothed portion 55, so that the wedge segments 27 are again locked.

Figure 7:
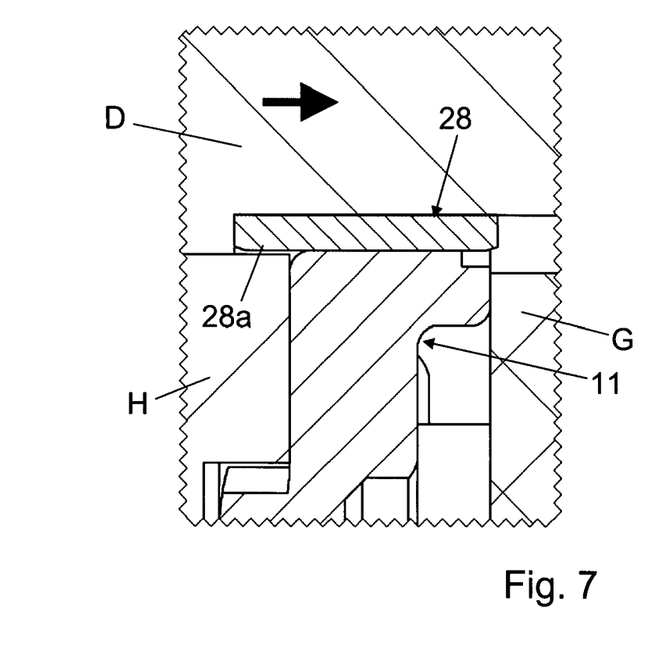
FIG. 7 is a partial sectional view with a pressed-in sliding bearing bushing before the formation of its securing region on the leading end.
Figure 8:
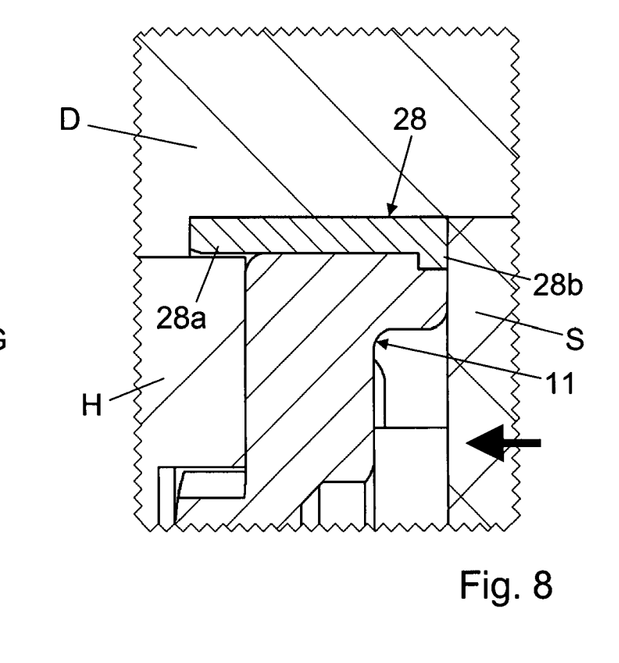
FIG. 8 is the partial sectional view of FIG. 7 after the formation of the securing region which is arranged in a recess of the first fitting part.

On the end remote from the overlap 28a the sliding bearing bushing 28 comprises a radially protruding securing region 28b which acts as axial securing against displacement of the sliding bearing bushing 28 in the axial direction away from the second fitting part 12. In the axial direction toward the second fitting part 12, the second fitting part acts as axial securing against displacement of the sliding bearing bushing 28. For introducing the sliding bearing bushing 28 into the receptacle of the first fitting part 11, in a first step the first fitting part 11 is positioned on a holder H of a tool and pre-centered and the sliding bearing bushing 28 is positioned on a mandrel D of the tool. In a second step, by a relative movement of the mandrel D and holder H (receiving the first fitting part 11), the sliding bearing bushing 28 is pressed into the receptacle of the first fitting part. In the context of an interference fit, the external dimension of the sliding bearing bushing 28 is selected to be the same or preferably (for tolerance compensation) slightly larger than the internal dimension of the receptacle of the first fitting part 11, so that the interference fit assists with the axial securing. The material of the first fitting part 11, due to a previously carried out hardening process, is preferably harder than the material of the sliding bearing bushing 28. Possible excess material, which is displaced due to the differences in dimensions during the pressing-in operation, collects on the trailing end of the sliding bearing bushing 28—relative to the movement of the mandrel D.

There are several options in order to create the securing region 28b. In this case, the securing region 28b which has been created may be arranged in an annular recess 11b of the first fitting part 11 around the receptacle for the sliding bearing bushing 28 (FIGS. 8, 9, 10, 11) or it may bear on the front face of the first fitting part 11 (FIG. 12) i.e. protrude axially.

Figure 9:
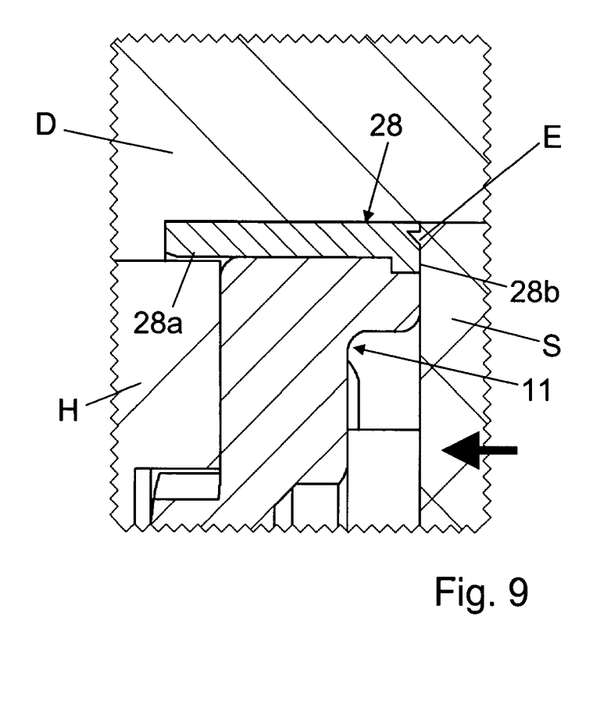
FIG. 9 is a partial sectional view corresponding to FIG. 8 with a cutting element on the punch.

The securing region 28b may be formed on the leading end of the sliding bearing bushing 28—relative to the movement of the mandrel D. To this end, in the aforementioned first step the first fitting part 11 is clamped between the holder H and a counter holder G. In the aforementioned second step, the sliding bearing bushing 28 is pressed-in sufficiently far that the overlap 28a is produced on the trailing end and a further overlap is produced (FIG. 7) on the leading end. The material of the further overlap is then shaped in a third step, by being forced radially outward, for example by means of a punch S, which is provided instead of the counter holder G and moved relative to the mandrel D, whilst the holder H and the mandrel D remain immobile relative to one another. The securing region 28b (FIG. 8) is produced by the shaping process. Preferably a cutting element E is formed on the punch S (FIG. 9). The cutting element E circulates at least partially in the peripheral direction and namely spaced apart from the mandrel D. The cutting element E simplifies the formation of the securing region 28b, by cutting into the sliding bearing bushing 28 and material being forced radially outward by means of its oblique surface.

Figure 10:
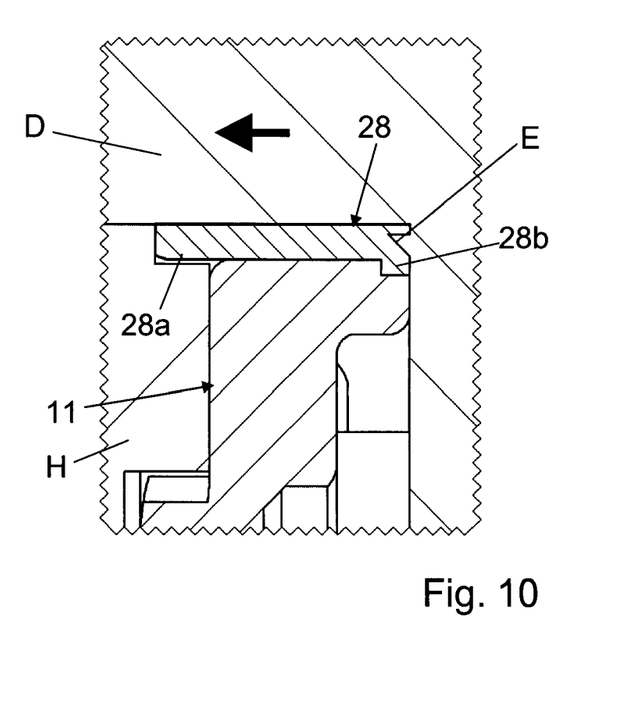
FIG. 10 is a partial sectional view with a sliding bearing bushing, the securing region thereof being produced on the trailing end by means of a cutting element.
Figure 11:
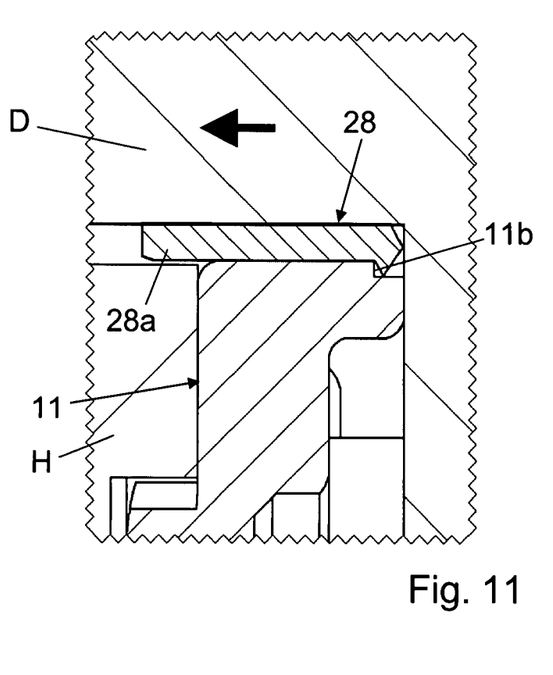
FIG. 11 is a partial sectional view with a sliding bearing bushing, the securing region thereof being pre-formed.

Alternatively, the securing region 28b may be formed on the trailing end of the sliding bearing bushing 28—relative to the movement of the mandrel D. Relative to the holder H, the mandrel D moves in the opposing direction to the direction shown in FIG. 7. In this case, two variants are possible. In one variant (FIG. 10) the securing region 28b is formed subsequently. The sliding bearing bushing 28 in the aforementioned second step is pressed-in sufficiently far by means of the mandrel D that the overlap 28a is produced on the leading end and a further overlap is produced on the trailing end. The second step ends, for example, when the overlap 28a comes to bear against the holder H, so that the movement of the sliding bearing bushing 28 is terminated. The material of the further overlap on the trailing end is then shaped in a third step (which seamlessly adjoins the second step), by being forced radially outward, so that the securing region 28b is produced. Preferably, the mandrel D continues its movement, but the holder H supports the sliding bearing bushing 28. A shaped contour is formed on the mandrel D, preferably a cutting element E (FIG. 10). Corresponding to the embodiment of FIG. 9, the cutting element E circulates at least partially in the peripheral direction. The cutting element E cuts into the sliding bearing bushing 28 and forces material radially outward by means of its oblique surface, in order to form the securing region 28b. The annular recess 11b may serve as a counter punch. In modifications, the securing region 28b is formed by means of a separate punch, an eccentricity, wobble riveting, or the like. The different disclosed steps may also be combined to form one or more steps.

Figure 12:
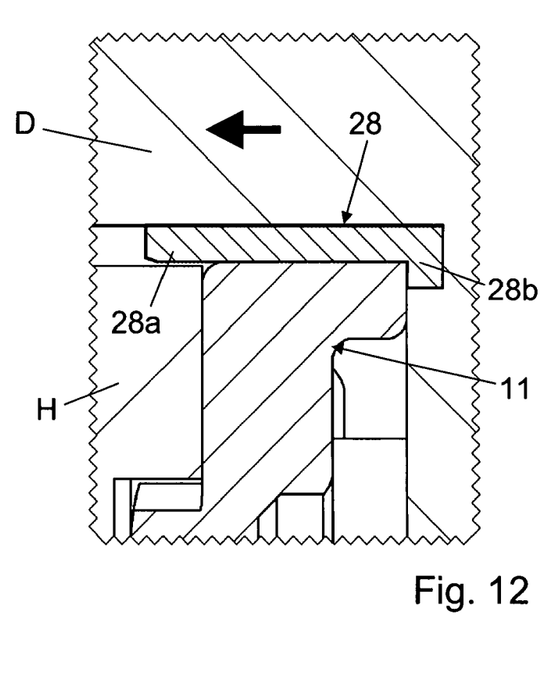
FIG. 12 is a partial sectional view with a sliding bearing bushing, the securing region thereof bearing against a front face of the first fitting part.

In the other variant (FIGS. 11, 12) the securing region 28b is already pre-formed or completely formed before being pressed into the sliding bearing bushing 28. Provided the securing region 28b is only pre-formed before the pressing-in operation, the sliding bearing bushing 28 is pressed-in, in the second step, until the overlap 28a is produced on the leading end and a further overlap is produced on the trailing end (FIG. 11), at least relative to the annular recess 11b. In the third step, the material of the pre-formed securing region 28b is shaped until it is complete, i.e. protrudes radially in the manner of a collar. This shaping may, for example, take place as in FIG. 10, by the holder H supporting the sliding bearing bushing 28 and the mandrel D moving forward. The mandrel D in this case comprises a shaping contour, preferably a cutting element E. The shaping may, for example, also take place by means of a separate punch. The annular recess 11b may serve as a counter punch. Provided the securing region 28b is already completely formed before the pressing-in operation, for example as a (radially protruding) collar, the sliding bearing bushing 28 in the second step is pressed-in until the overlap 28a is produced on the leading end and the securing region 28b reaches its end position on the trailing end, i.e. comes to rest in the annular recess 11b (end position of the sliding bearing bushing 28 as in FIG. 8) or bears against the front face of the first fitting part 11 (FIG. 12).

While a specific embodiment of the invention has been shown and described in detail to illustrate the application of the principles of the invention, it will be understood that the invention may be embodied otherwise without departing from such principles.

The invention claimed is:

1. A method for producing a vehicle seat fitting, the method comprising the steps of:
   a) pressing a sliding bearing bushing in an axial direction into a receptacle of a first fitting part; wherein the pressed-in sliding bearing bushing comprises a radially protruding securing region; and
   b) forming the securing region before or after the pressing-in step;
   wherein the securing region is completely formed on a trailing end after the pressing-in step, by material of the sliding bearing bushing being forced radially outward, by means of a cutting element.

2. A method as claimed in claim 1, wherein the securing region is arranged in a recess of the first fitting part, after the pressing-in step.

3. A method as claimed in claim 1, wherein the securing region bears against a front face of the first fitting part, after the pressing-in step.

4. A method as claimed in claim 1, wherein an axial overlap is formed on an end of the sliding bearing bushing remote from the securing region, after the pressing-in step.

5. A method as claimed in claim 1, wherein: the pressed-in sliding bearing bushing receives an eccentric which is supported on a second fitting part; the second fitting part is in a geared connection with the first fitting part by means of a gearwheel and a gear ring which mesh together; the eccentric is driven during use in a circulating manner by a drive element, producing a relative rolling movement of the gearwheel and gear ring; a locking element locks the eccentric in a non-driven state of the fitting by cooperation with a toothed portion formed on the first fitting part and which releases the eccentric when driven by a drive element; and the locking element is mounted on an axial overlap of the sliding bearing bushing.

* * * * *